US009430332B1

(12) United States Patent
Bahadure

(10) Patent No.: US 9,430,332 B1
(45) Date of Patent: Aug. 30, 2016

(54) SYSTEMS AND METHODS FOR ENABLING EFFICIENT ACCESS TO INCREMENTAL BACKUPS

(71) Applicant: Symantec Corporation, Mountain View, CA (US)

(72) Inventor: Ashutosh Bahadure, Lake Mary, FL (US)

(73) Assignee: Veritas Technologies LLC, Mountain View, CA (US)

( * ) Notice: Subject to any disclaimer, the term of this patent is extended or adjusted under 35 U.S.C. 154(b) by 312 days.

(21) Appl. No.: 13/873,211

(22) Filed: Apr. 29, 2013

(51) Int. Cl.
*G06F 17/30* (2006.01)
*G06F 11/14* (2006.01)

(52) U.S. Cl.
CPC ..... *G06F 11/1451* (2013.01); *G06F 17/30088* (2013.01); *G06F 17/30575* (2013.01)

(58) Field of Classification Search
CPC .............. G06F 2201/84; G06F 17/30233; G06F 11/1446; G06F 17/30088; G06F 17/30159; G06F 17/3023; G06F 11/1469; G06F 17/30289; G06F 17/30575; G06F 17/30581; G06F 17/3012
USPC .................................................. 707/640–648
See application file for complete search history.

(56) References Cited

U.S. PATENT DOCUMENTS

| 7,257,689 | B1 * | 8/2007 | Baird | G06F 11/1471 707/999.201 |
| 7,440,965 | B1 * | 10/2008 | Pruthi | G06F 11/1448 |
| 7,694,088 | B1 | 4/2010 | Bromley et al. | |
| 7,873,601 | B1 * | 1/2011 | Kushwah | 707/654 |
| 8,060,481 | B1 * | 11/2011 | Harmer | G06F 11/14 707/695 |
| 8,200,638 | B1 * | 6/2012 | Zheng | G06F 11/1464 707/679 |
| 8,572,046 | B2 * | 10/2013 | Becker | G06F 11/1456 707/648 |
| 8,924,360 | B1 * | 12/2014 | Caputo | G06F 11/1469 707/684 |
| 9,104,621 | B1 * | 8/2015 | Caputo | G06F 11/1469 |
| 2009/0182789 | A1 | 7/2009 | Sandorfi et al. | |
| 2009/0271456 | A1 * | 10/2009 | Kushwah | G06F 11/1469 |
| 2009/0299966 | A1 * | 12/2009 | Schneider | G06F 17/30327 |
| 2011/0113012 | A1 * | 5/2011 | Gruhl | G06F 11/1451 707/646 |
| 2013/0232119 | A1 * | 9/2013 | Aronovich et al. | 707/653 |

(Continued)

OTHER PUBLICATIONS

Unitrends; Full-Time Protection. (A Pink Slip for your Nightly Backups) Incremental Backup with Point-in-Time Recovery; http://www.unitrends.com/features/incremental-forever.html; as accessed on Dec. 21, 2012.

(Continued)

*Primary Examiner* — Michelle Owyang
(74) *Attorney, Agent, or Firm* — ALG Intellectual Property, LLC

(57) ABSTRACT

A computer-implemented method for enabling efficient access to incremental backups may include selecting an incremental backup of a volume of data, the incremental backup of the volume of data storing blocks from the volume of data that have changed since a previous backup of the volume of data, identifying block metadata for the incremental backup that describes a location of each block within the blocks in the incremental backup, detecting synthesized block metadata for the previous backup that describes a location of each block in the volume according to a synthesized view of the volume of data from a full backup of the volume up to the previous backup, and combining the block metadata for the incremental backup with the synthesized block metadata for the previous backup to generate new synthesized block metadata for the incremental backup. Various other methods, systems, and computer-readable media are also disclosed.

14 Claims, 7 Drawing Sheets

(56) References Cited

U.S. PATENT DOCUMENTS

2014/0095817 A1* 4/2014 Hsu et al. .................. 711/162
2014/0250078 A1* 9/2014 Gardner ............ G06F 17/30156
                                                    707/646

OTHER PUBLICATIONS

Storagenewsletter.com; Veeam Backup and Replication for Hyper-V Available as Expected . . . ; http://www.storagenewsletter.com/news/software/veeam-backup-replication-hyper-v; Dec. 1, 2011; As accessed on Dec. 21, 2012.

Jerome Wendt et al.; Virtual Backup Appliances Get a Personality in Eversync 5.1; Eversync; http://www.eversyncsolutions.com/blog/; Feb. 5, 2013; as accessed on Feb. 5, 2013.

Dean Elling; Systems and Methods for Creating Reference-Based Synthetic Backups; U.S. Appl. No. 12/553,723, filed Sep. 3, 2009.

Sameer Mahajan et al.; Systems and Methods for Performing Incremental Backups; U.S. Appl. No. 13/363,982; Feb. 1, 2012.

Dell Inc.; Incremental forever—Dell AppAssure Backup, Replication & Recovery: Continuous Backup for Windows Servers, VMware & Hyper-V; Dec. 4, 2010; http://www.appassure.com/incremental-forever/, as accessed Dec. 21, 2012.

* cited by examiner

SYSTEMS AND METHODS FOR ENABLING EFFICIENT ACCESS TO INCREMENTAL BACKUPS

BACKGROUND

In the digital age, organizations increasingly rely on digitally-stored data. To protect against data loss, an organization may use a backup system to back up important data. Traditional backup systems may periodically create a full backup by capturing all allocated blocks of a backup source. Between full backups, a backup system may capture intermediate backups, referred to as incremental backups, which include blocks that have changed since the previous incremental or full backup. An incremental backup may be orders of magnitude smaller and faster than a full backup.

In some scenarios, incremental backups may take the form of virtual disk files. Some traditional systems may perform granular point-in-time recoveries of data from such incremental backups by performing "disk chaining," where each incremental backup virtual disk file from the point-in-time incremental backup to the full backup is mounted in a sequential chain. An attempt to read a block at the point-in-time may then start from the incremental backup and work back up the chain until the block is encountered. Unfortunately, if there is a very large number of incremental backups (e.g., because incremental backups are preserved indefinitely), this approach may significantly impact recovery performance while consuming significant computing resources. Some traditional backup systems may break such a long chain of incremental backups by creating synthetic backups, which combine the data from an initial full backup (or previous synthetic backup) with each subsequent incremental backup until the desired point in time for the synthetic backup is reached. Unfortunately, the process of creating synthetic backups may also consume a significant amount of computing resources, and storing synthetic backups may consume a significant amount of storage space.

Accordingly, the instant disclosure identifies and addresses a need for additional and improved systems and methods for enabling efficient access to incremental backups.

SUMMARY

As will be described in greater detail below, the instant disclosure generally relates to systems and methods for enabling efficient access to incremental backups by creating synthetic views of incremental backups by combining block metadata of incremental backups with block metadata of previous backups (e.g., by combining block metadata of an incremental backup with the block metadata of a prior full backup or with the previously-generated synthetic block metadata of a prior incremental backup).

In one example, a computer-implemented method for enabling efficient access to incremental backups may include (1) selecting an incremental backup of a volume of data, the incremental backup of the volume of data storing a plurality of blocks from the volume of data that have changed since a previous backup of the volume of data, (2) identifying block metadata for the incremental backup that describes a location of each block within the plurality of blocks in the incremental backup, (3) detecting synthesized block metadata for the previous backup that describes a location of each block in the volume of data according to a synthesized view of the volume of data from a full backup of the volume of data up to the previous backup, the synthesized view representing a full view of the volume of data at a time of the previous backup and (4) combining the block metadata for the incremental backup with the synthesized block metadata for the previous backup to generate new synthesized block metadata for the incremental backup, the new synthesized block metadata identifying a location of a most current version of each block within the volume of data since the full backup.

In some examples, the computer-implemented method may further include storing the new synthesized block metadata in association with the incremental backup for use by a recovery system to interpret the incremental backup in a new synthesized view.

In some examples, the computer-implemented method may further include recovering at least one block of the volume of data at a time of the incremental backup by identifying a storage location of the block according to the new synthesized block metadata for the incremental backup.

In some examples, the computer-implemented method may further include recovering a file as stored on the volume of data at a time of the incremental backup by identifying a storage location of each block of the file according to the new synthesized block metadata for the incremental backup.

In one embodiment, (1) the previous backup may include a first sparse virtual disk file and (2) the incremental backup may include a second sparse virtual disk file.

In some examples, identifying the block metadata for the incremental backup may include identifying the block metadata within the second sparse virtual disk file.

In some examples, combining the block metadata with the synthesized block metadata to generate the new synthesized block metadata for the incremental backup may include generating the new synthesized block metadata without copying the plurality of blocks to generate a synthetic backup.

In one embodiment, a system for implementing the above-described method may include (1) a selection module that selects an incremental backup of a volume of data, the incremental backup of the volume of data storing a plurality of blocks from the volume of data that have changed since a previous backup of the volume of data, (2) an identification module that identifies block metadata for the incremental backup that describes a location of each block within the plurality of blocks in the incremental backup, (3) a detection module that detects synthesized block metadata for the previous backup that describes a location of each block in the volume of data according to a synthesized view of the volume of data from a full backup of the volume of data up to the previous backup, the synthesized view representing a full view of the volume of data at a time of the previous backup, (4) a combining module that combines the block metadata for the incremental backup with the synthesized block metadata for the previous backup to generate new synthesized block metadata for the incremental backup, the new synthesized block metadata identifying a location of a most current version of each block within the volume of data since the full backup and (5) at least one processor configured to execute the selection module, the identification module, the detection module and the combining module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) select an incremental backup of a volume of data, the incremental backup of the volume of data storing a plurality of blocks from the volume of data that have changed since a previous backup of the volume of data, (2) identify block metadata for the incremental backup that describes a location of each block within the plurality of blocks in the incremental backup, (3) detect synthesized block metadata for the previous backup that describes a location of each block in the volume of data according to a synthesized view of the volume of data from a full backup of the volume of data up to the previous backup, the synthesized view representing a full view of the volume of data at a time of the previous backup and (4) combine the block metadata for the incremental backup with the synthesized block metadata for the previous backup to generate new synthesized block metadata for the incremental backup, the new synthesized block metadata identifying a location of a most current version of each block within the volume of data since the full backup.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
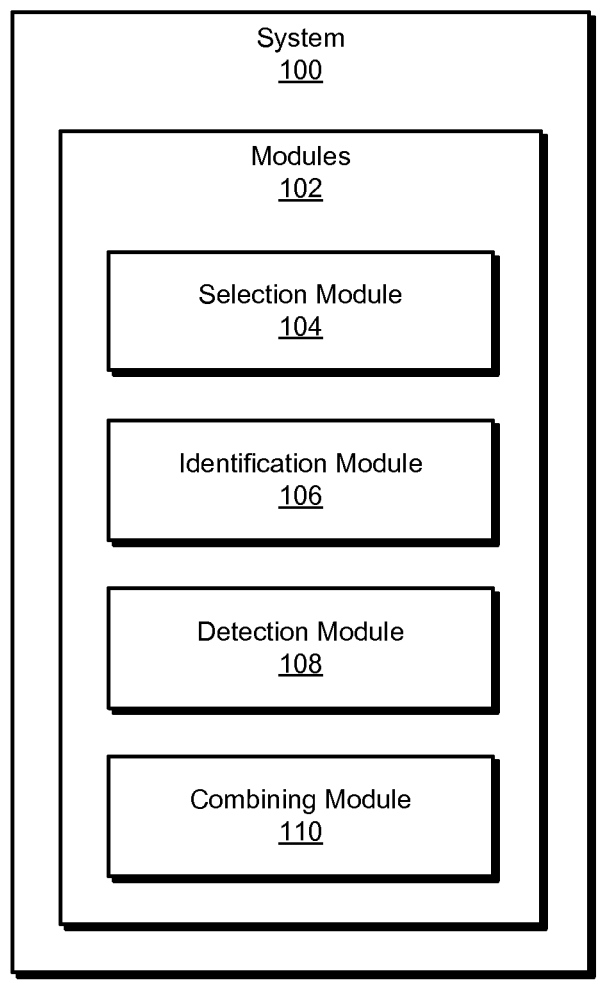
FIG. 1 is a block diagram of an exemplary system for enabling efficient access to incremental backups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for enabling efficient access to incremental backups. As will be explained in greater detail below, by creating synthetic views of incremental backups by combining block metadata of incremental backups with block metadata of previous backups, the systems and methods described herein may facilitate quick and granular recovery of point-in-time backup data without consuming large amounts of computing resources to create and/or store synthetic backups from the incremental backups. In some examples, these systems may facilitate efficient recovery of data from forever incremental backups (e.g., indefinitely long series of incremental backups without interstitial synthetic backups) without requiring the copying and/or movement of data blocks from incremental backups. In addition, in some examples these systems and methods may successfully operate when backup data is stored in a native mountable format (e.g., a virtual disk format native to another system). In some examples, these systems and methods may be applied to existing backup series without significantly altering and/or moving data blocks stored by the existing backups (e.g, except for, in some examples, backup metadata), and may be efficiently applied to reconstruct synthetic views of incremental backups at relatively low computational costs.

Figure 2:
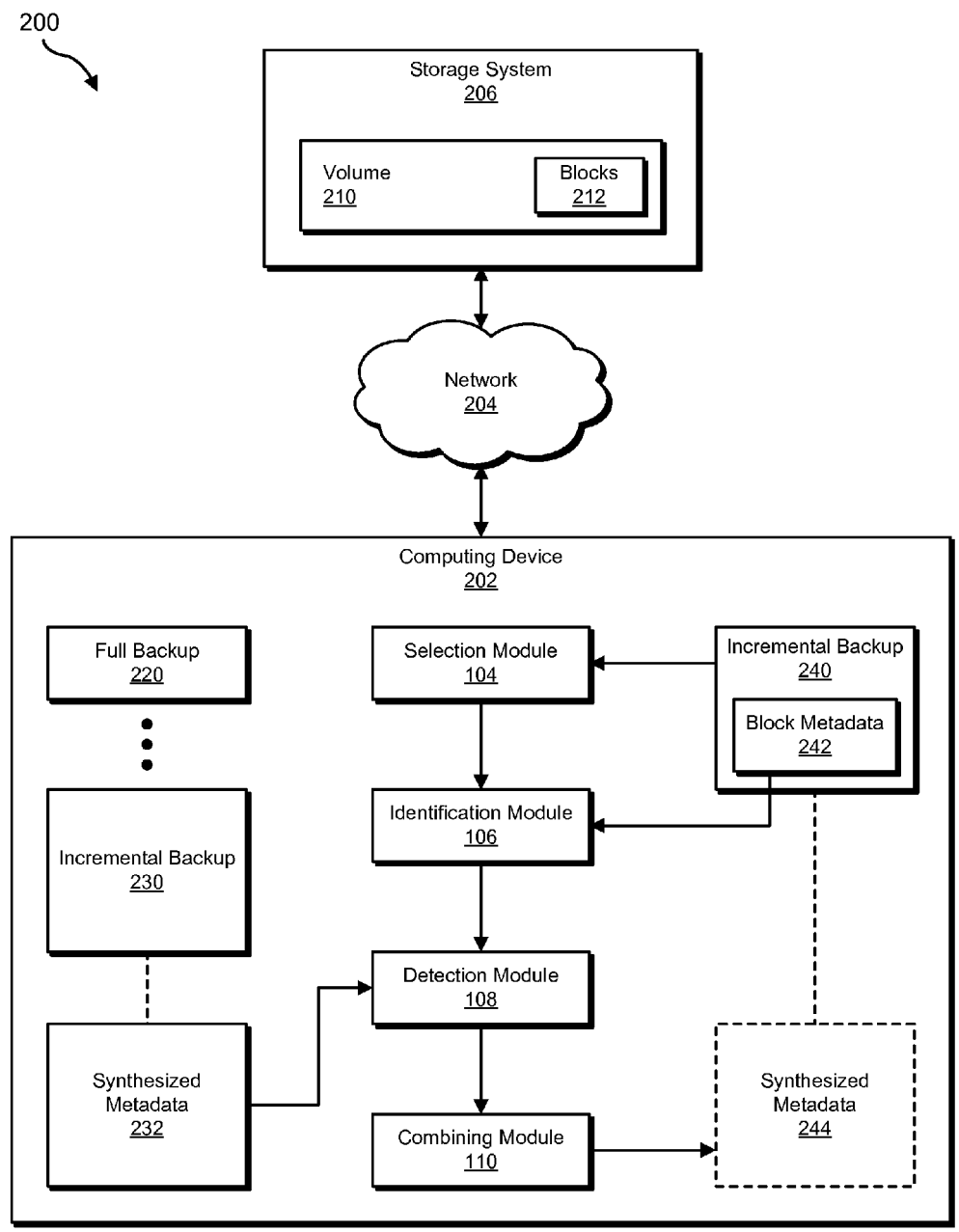
FIG. 2 is a block diagram of an exemplary system for enabling efficient access to incremental backups.

The following will provide, with reference to FIGS. 1-2, detailed descriptions of exemplary systems for enabling efficient access to incremental backups. Detailed descriptions of corresponding computer-implemented methods will also be provided in connection with FIG. 3. Detailed descriptions of exemplary backups will be provided in connection with FIGS. 4-5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for enabling efficient access to incremental backups. As illustrated in this figure, exemplary system 100 may include one or more modules 102 for performing one or more tasks. For example, and as will be explained in greater detail below, exemplary system 100 may also include a selection module 104 that may select an incremental backup of a volume of data, the incremental backup of the volume of data storing a plurality of blocks from the volume of data that have changed since a previous backup of the volume of data. Exemplary system 100 may additionally include an identification module 106 that may identify block metadata for the incremental backup that describes a location of each block within the plurality of blocks in the incremental backup. Exemplary system 100 may also include a detection module 108 that may detect synthesized block metadata for the previous backup that describes a location of each block in the volume of data according to a synthesized view of the volume of data from a full backup of the volume of data up to the previous backup, the synthesized view representing a full view of the volume of data at a time of the previous backup. Exemplary system 100 may additionally include a combining module 110 that may combine the block metadata for the incremental backup with the synthesized block metadata for the previous backup to generate new synthesized block metadata for the incremental backup, the new synthesized block metadata identifying a location of a most current version of each block within the volume of data since the full backup. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or storage system 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a storage system 206 via a network 204. Computing device 202 may be programmed with one or more of modules 102. Additionally or alternatively, storage system 206 may be programmed with one or more of modules 102 and/or may store all or a portion of the data in volume 210.

In one embodiment, one or more of modules 102 from FIG. 1 may, when executed by at least one processor of computing device 202 and/or storage system 206, facilitate computing device 202 and/or storage system 206 in enabling efficient access to incremental backups. For example, computing device 202 may create and/or manage one or more backups of volume 210 on storage system 206, including a full backup 220, an incremental backup 230, and an incremental backup 240. In some examples, and as will be described in greater detail below, one or more of modules 102 may cause computing device 202 and/or storage system 206 to enable efficient access to an incremental backup 240 (e.g., to perform a granular recovery of data from volume 210 at a point-in-time corresponding to incremental backup 240). For example, and as will be described in greater detail below, selection module 104 may be programmed to select incremental backup 240 of volume 210, incremental backup 240 of volume 210 storing blocks 212 from volume 210 that have changed since previous incremental backup 230 of volume 210. Identification module 106 may be programmed to identify block metadata 242 for incremental backup 240 that describes a location of each block within blocks 212 in incremental backup 240. Detection module 108 may be programmed to detect synthesized metadata 232 for incremental backup 230 that describes a location of each block in volume 210 according to a synthesized view of volume 210 from full backup 220 up to incremental backup 230, the synthesized view representing a full view of volume 210 at a time of incremental backup 230. Combining module 110 may be programmed to combine block metadata 242 for incremental backup 240 with synthesized metadata 232 for the incremental backup 230 to generate new synthesized metadata 244 for incremental backup 240, the synthesized metadata 244 identifying a location of a most current version of each block within volume 210 since full backup 220.

Computing device 202 generally represents any type or form of computing device capable of reading computer-executable instructions. Examples of computing device 202 include, without limitation, servers, laptops, tablets, desktops, cellular phones, Personal Digital Assistants (PDAs), multimedia players, embedded systems, combinations of one or more of the same, exemplary computing system 610 in FIG. 6, or any other suitable computing device. For example, computing device may represent a backup server, a backup appliance, and/or a server for managing, manipulating, administering, and/or storing backup data.

Storage system 206 generally represents any type or form of computing device that is capable of storing data to be backed up. In some examples, storage system 206 may represent a portion of a storage device. Additionally or alternatively, storage system 206 may represent a portion of multiple storage devices. In some examples, storage system 206 may store data for one or more host systems, application servers, and/or database servers configured to provide various database services and/or run certain software applications. In some examples, storage system 206 may store one or more virtual disk files (e.g., volume 210).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and storage system 206.

Figure 3:
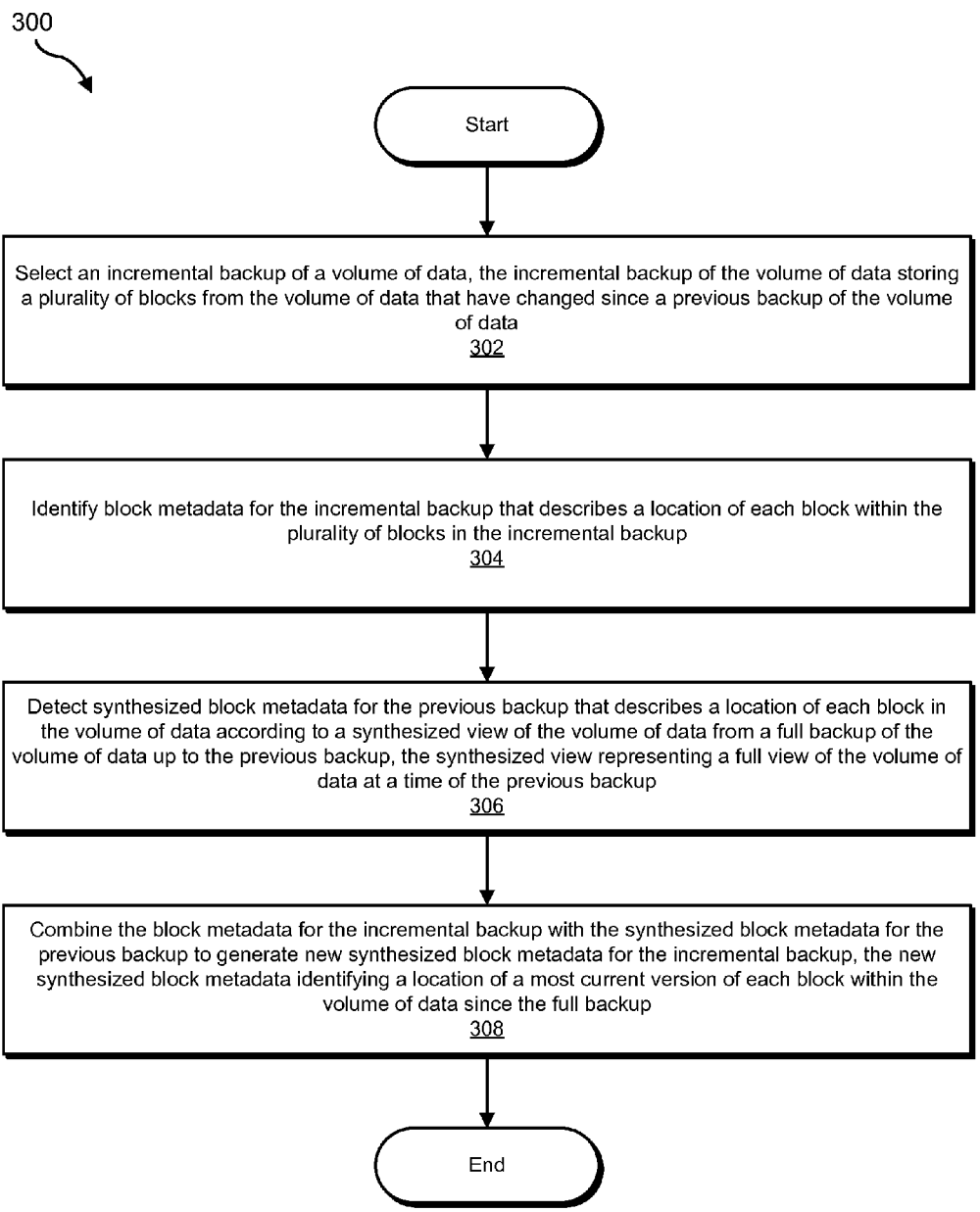
FIG. 3 is a flow diagram of an exemplary method for enabling efficient access to incremental backups.

FIG. 3 is a flow diagram of an exemplary computer-implemented method 300 for enabling efficient access to incremental backups. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may select an incremental backup of a volume of data, the incremental backup of the volume of data storing a plurality of blocks from the volume of data that have changed since a previous backup of the volume of data. For example, at step 302 selection module 104 may, as part of computing device 202 in FIG. 2, select incremental backup 240 of volume 210, incremental backup 240 of volume 210 storing blocks 212 from volume 210 that have changed since previous incremental backup 230 of volume 210.

As used herein, the term "volume" may refer to any discrete and/or defined collection of data. Examples of a volume include, without limitation, a virtual disk file, a virtual disk, a physical disk, a file system partition, a logical volume, an image, a database, and/or a collection of files defined by a backup policy. As used herein, the term "backup" may refer to any procedure to backup, duplicate, and/or protect data and/or the results of any such procedure.

As used herein, the phrase "incremental backup" generally refers to any data backup that includes less than every data unit (e.g., segment, block, sector, cluster, file, etc.) in a set of data units. For example, an incremental backup may only include data units that have changed since a previous point in time (e.g., the time a previous full backup or other incremental backup was taken). Accordingly, an incremental backup may only include data that has changed (e.g., data that has been modified, added, deleted, etc.) since a previous backup. In some examples, the previous backup may include an incremental backup.

As used herein, the term "block" may refer to any discrete unit of data. In some examples, the term "block" may refer to a fixed-size unit of data within a file. For example, the term "block" may refer to a block, a cluster, and/or a sector. Additionally or alternatively, in some examples the term "block" may refer to a variable-size unit of data, such as an extent.

In some examples, the previous backup may include a first sparse virtual disk file and the incremental backup may include a second sparse virtual disk file. As used herein, the phrase "virtual disk file" may refer to any file and/or image containing data in a format readable by and/or stored for the use of a virtual machine and/or system configured to access virtualized storage. In some examples, the data as stored within the virtual disk file may reflect the raw contents and/or structure of a virtual storage device or "virtual disk." Examples of virtual disk files include, without limitation, a VMWARE VIRTUAL MACHINE DISK file (a "VMDK file") and a VIRTUAL HARD DISK file (a "VHD file"). As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications. As used herein, the term "sparse" as relates to a virtual disk file may refer to a virtual disk file that stores allocated blocks and does not store unallocated blocks. In the context of incremental backups, a sparse virtual disk file may be used to store an incremental backup by only storing changed blocks. In some examples, a sparse virtual disk file may include a differencing virtual disk file and/or a dynamic virtual disk file.

Selection module 104 may select the incremental backup in any suitable context. For example, selection module 104 may select the incremental backup by identifying the creation of the incremental backup (and/or by creating the incremental backup). Additionally or alternatively, selection module 104 may select the incremental backup by determining that the incremental backup is an earliest incremental backup of the volume of data that does not have synthesized metadata available to provide a full, synthesized view of the volume at the point in time of the incremental backup. For example, the systems and methods described herein may have generated metadata for synthesized point-in-time views for each incremental backup following a full backup up to the selected incremental backup.

Figure 4:
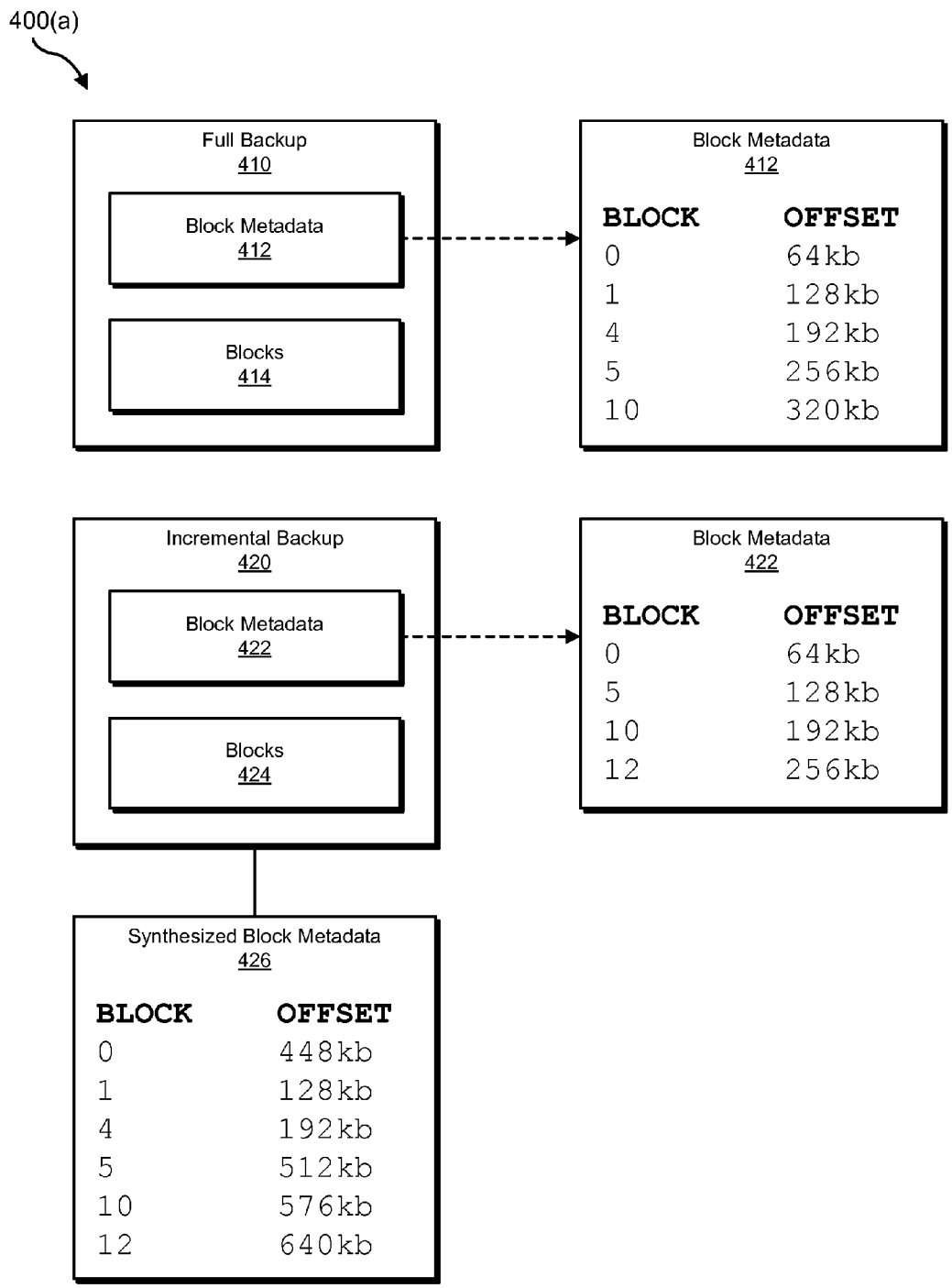
FIG. 4 is a block diagram of an exemplary system for enabling efficient access to incremental backups.
Figure 5:
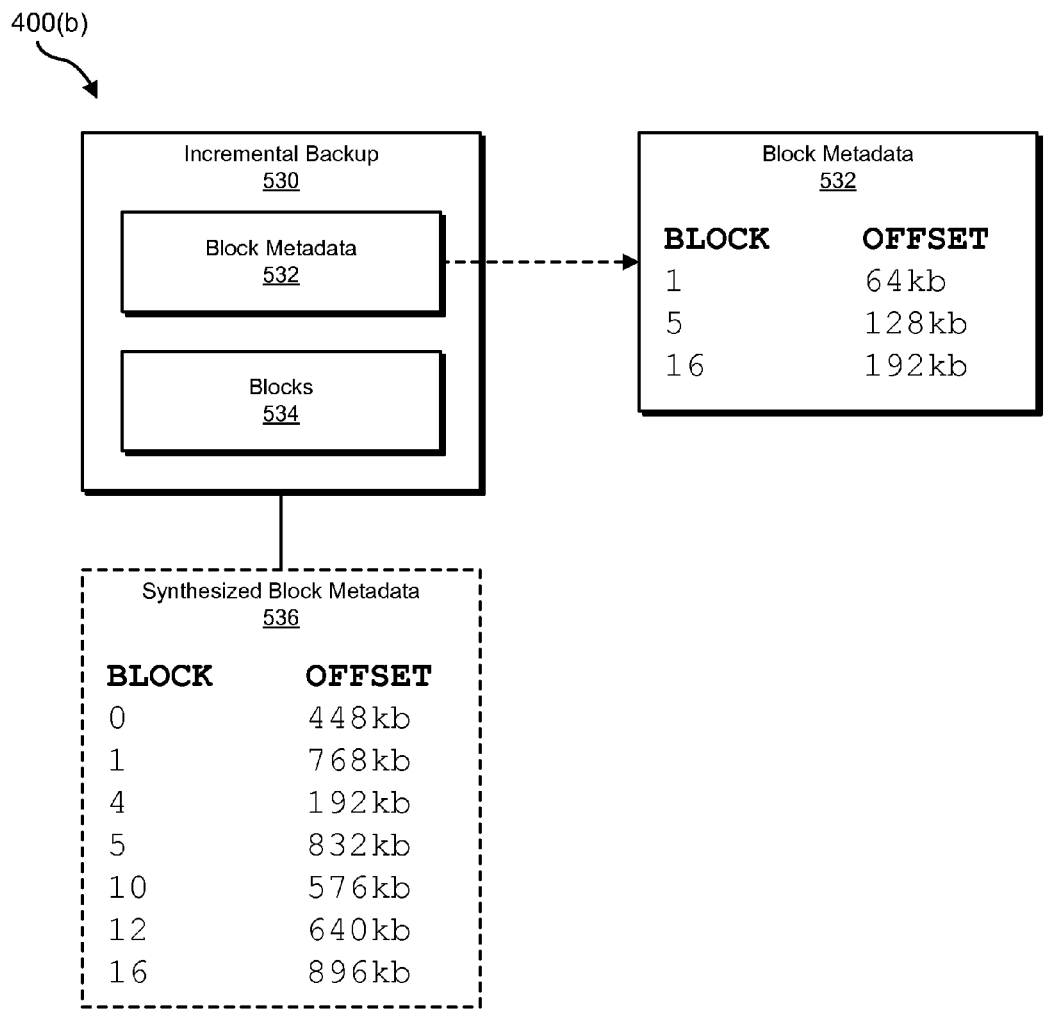
FIG. 5 is a block diagram of an exemplary system for enabling efficient access to incremental backups.

FIGS. 4-5 illustrate an exemplary backup set 400(a)-(b). As shown in FIG. 4, backup set 400(a) may include a full backup 410 and a subsequent incremental backup 420. As show in FIG. 5, backup set 400(b) may include an incremental backup 530 subsequent to incremental backup 420. Using FIGS. 4-5 as an example, at step 302 selection module 104 may select incremental backup 530 (e.g., for creating synthesized block metadata 536 to provide a synthesized view of incremental backup 530).

Returning to FIG. 3, at step 304 one or more of the systems described herein may identify block metadata for the incremental backup that describes a location of each block within the plurality of blocks in the incremental backup. For example, at step 304 identification module 106 may, as part of computing device 202 in FIG. 2, identify block metadata 242 for incremental backup 240 that describes a location of each block within blocks 212 in incremental backup 240.

Identification module 106 may identify the block metadata for the incremental backup in any suitable manner. For example, as mentioned above, the incremental backup may include a sparse virtual disk file. In this example, identification module 106 may identify the block metadata within the sparse virtual disk file. In some examples, identification module 106 may find a separate file associated with the incremental backup that contains metadata describing the incremental backup (e.g., which blocks of the volume are stored by the incremental backup and/or the location of the blocks within the incremental backup).

The block metadata may include metadata of any suitable format for identifying changed blocks stored in the incremental backup and/or the location of the changed blocks within the incremental backup. For example, the block metadata may include a map and/or table that maps block numbers of the volume of data to offsets within the incremental backup. In some examples (e.g., where the block size is fixed), the block metadata may simply include a list of blocks saved within the incremental backup (e.g., thereby implicitly disclosing the offsets at which each block is stored within the incremental backup with the understanding that the blocks are stored in order). In some examples, the block metadata may include a grain table and/or a block allocation table within a virtual disk format.

Using FIG. 5 as an example, identification module 106 may identify block metadata 532 for incremental backup 530. For example, incremental backup 530 may represent a sparse virtual disk file, and block metadata 532 may be stored within a header and/or footer of the sparse virtual disk file. As shown in FIG. 5, block metadata 532 may include information indicating that blocks 1, 5, and 16 (e.g, blocks of 64 kb) of the volume are stored at offsets 64 kb, 128 kb, and 192 kb of incremental backup 530, respectively (e.g., allowing for a 64 kb header to be stored at offset 0 kb of incremental backup 530).

Returning to FIG. 3, at step 306 one or more of the systems described herein may detect synthesized block metadata for the previous backup that describes a location of each block in the volume of data according to a synthesized view of the volume of data from a full backup of the volume of data up to the previous backup, the synthesized view representing a full view of the volume of data at a time of the previous backup. For example, at step 306 detection module 108 may, as part of computing device 202 in FIG. 2, detect synthesized metadata 232 for incremental backup 230 that describes a location of each block in volume 210 according to a synthesized view of volume 210 from full backup 220 up to incremental backup 230, the synthesized view representing a full view of volume 210 at a time of incremental backup 230.

As used herein, the phrase "synthesized view" generally refers to any view of a backup subject at a point in time that provides a full view of all parts of the backup subject at the point in time. For example, a synthesized view of the volume of data may provide a view of blocks that were backed up in an initial full backup as well as blocks but that have not subsequently changed as well as the latest versions of blocks that have changed in subsequent incremental backups.

Detection module 108 may detect the synthesized block metadata for the previous backup in any suitable manner. For example, detection module 108 may first identify the previous backup and then identify an association between the previous backup and the synthesized block metadata that provides a synthesized view at the point in time captured by the previous backup. In some examples, detection module 108 may detect the synthesized block metadata for the previous backup after one or more of the systems described herein create the synthesized block metadata for the previous backup. For example, the systems and methods described herein may have generated the synthesized block metadata for the previous backup by combining block metadata for the previous backup with synthesized block metadata for an incremental backup that precedes the previous backup (or with block metadata for a full backup that precedes the previous backup).

Using FIGS. 4-5 as an example, incremental backup 420 may be associated with synthesized block metadata 426. For example, the systems and methods described herein may have generated synthesized block metadata 426 by combining block metadata 412 with block metadata 422. Synthesized block metadata 426 may therefore describe the location of each block of the volume at the point in time of incremental backup 420, whether a given block is stored in full backup 410 or incremental backup 420. For example, full backup 410 may be 384 kb in size and incremental backup 420 may be 320 kb in size. As will be explained in greater detail below, offsets listed for blocks in synthesized block metadata 426 may describe the locations of the blocks as if full backup 410 and incremental backup 420 were contiguous portions of a single disk (e.g., blocks with synthesized offsets at 384 kb or greater representing blocks stored within incremental backup 420; blocks with synthesized offsets at 320 kb or lower representing blocks stored within full backup 410). Accordingly, at step 306 detection module 108 may detect synthesized block metadata 426 (as representing synthesized metadata pertaining to the backup prior to incremental backup 530).

Returning to FIG. 3, at step 308 one or more of the systems described herein may combine the block metadata for the incremental backup with the synthesized block metadata for the previous backup to generate new synthesized block metadata for the incremental backup, the new synthesized block metadata identifying a location of a most current version of each block within the volume of data since the full backup. For example, at step 308 combining module 110 may, as part of computing device 202 in FIG. 2, combine block metadata 242 for incremental backup 240 with synthesized metadata 232 for the incremental backup 230 to generate new synthesized metadata 244 for incremental backup 240, the synthesized metadata 244 identifying a location of a most current version of each block within volume 210 since full backup 220.

Combining module 110 may combine the block metadata with the synthesized block metadata in any suitable manner. In some examples, combining module 110 may generate the new synthesized block metadata without copying the plurality of blocks to generate a synthetic backup. As used herein, the phrase "synthetic backup" may refer to a point-in-time full backup constructed from an original full backup and any subsequent incremental backup up to the point in time. While traditional approaches may generate synthetic backups by copying data blocks from a full backup and/or one or more incremental backups, the systems and methods described herein may preserve data blocks in their original backup locations and reference these original locations to create a synthesized view of an incremental backup.

In some examples, the new synthesized block metadata may identify the location of the most current version (e.g., as of the incremental backup) of each block within the volume of data since the full backup by indicating, for each block within the volume of data, a backup file in which the most current version of the block is stored and an offset within the backup file at which the most current version of the block is stored. For example, combining module 110 may create the new synthesized block metadata by storing a backup file reference number and an offset for each block of the volume at the point in time of the incremental backup. In another example, combining module 110 may encode which backup file stores the block as a part of an enhanced offset. For example, as mentioned earlier, combining module 110 may treat the series of backups as contiguous portions of a single disk and associate offsets for each block accordingly.

Using FIGS. 4-5 as an example, full backup 410 may be 384 kb in size, storing a 64 kb header and blocks 0, 1, 4, 5, and 10 of 64 kb each. Incremental backup 420 may be 320 kb in size, storing a 64 kb header and changed blocks 0, 5, and 10, and new block 12. Accordingly, combining module 110 may have previously generated synthesized block metadata 426 by representing blocks 1 and 4 at their offsets in full backup 410. Additionally combining module 110 may have represented changed blocks 0, 5, 10, and new block 12 as starting at offset 64 kb (i.e., after a 64 kb header) in incremental backup 420 by adding the size of full backup 410 (384 kb) to the offsets of each block stored in incremental backup 420. Likewise, combining module 110 may combine synthesized block metadata 426 and 536 block metadata 532 to create synthesized block metadata. For example, combining module 110 may preserve the synthesized offset representations of blocks 0, 4, 10, and 12 that did not change since incremental backup 420. In addition, combining module 110 may represent changed blocks 1, 5, and 16 as starting at offset 64 kb in incremental backup 530 by adding the sizes of full backup 410 (384 kb) and incremental backup 420 (320 kb) to the offsets of each block stored in incremental backup 530. In this manner, combining module 110 may need only to perform minimal computations and consume minimal storage to create a synthesized view for each successive incremental backup In some examples, one or more of the systems described herein may also store the new synthesized block metadata in association with the incremental backup for use by a recovery system to interpret the incremental backup in a synthesized view. For example, combining module 110 may store the new synthesized block metadata and record in a catalog that the new synthesized block metadata corresponds to the incremental backup. Additionally or alternatively, combining module 110 may create a copy of the incremental backup and replace block metadata of the incremental backup with the new synthesized block metadata.

In some examples, one or more of the systems described herein may recover at least one block of the volume of data as the block was at the time of the incremental backup by identifying a storage location of the block according to the new synthesized block metadata for the incremental backup. For example, a recovery system may identify a synthesized offset of the block within the new synthesized block metadata and decode the synthesized offset to identify a backup file in which the correct version of the block is stored and an offset within the backup file at which the correct version of the block is stored. In some examples, one or more of the systems described herein may recover a file as stored on the volume of data as the file was at the time of the incremental backup by identifying a storage location of each block of the file according to the new synthesized block metadata for the incremental backup. In this manner, the systems and methods described herein may achieve an efficient granular recovery of data from incremental backups. In some examples, a system may mount the incremental backup with the new synthesized block metadata for reading.

Figure 6:
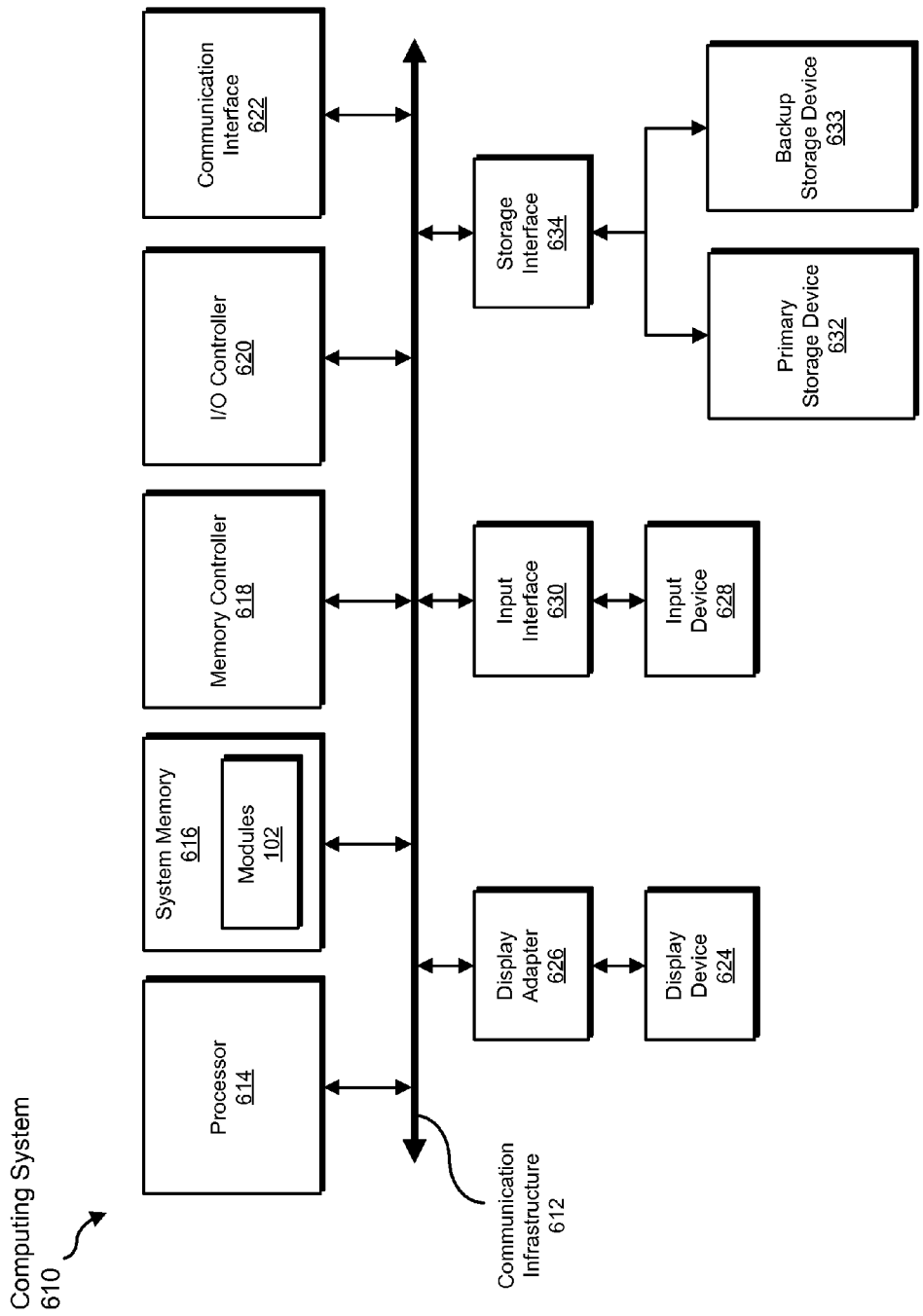
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
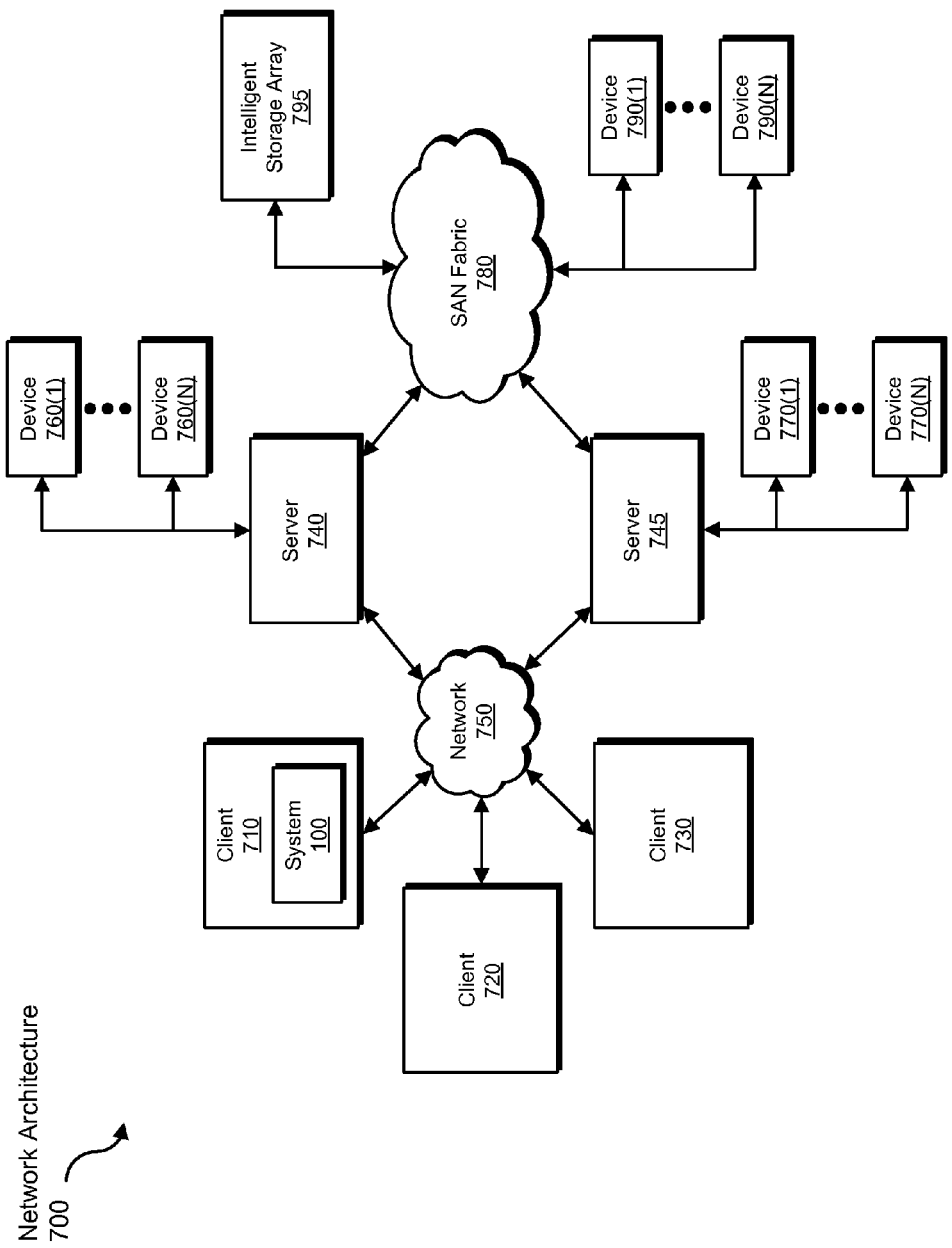
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for enabling efficient access to incremental backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive incremental backup metadata to be transform, transform the incremental backup metadata, output a result of the transformation to a new metadata structure, use the result of the transformation to provide a synthetic view of data at the time of an incremental backup, and store the result of the transformation to a backup system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enabling efficient access to incremental backups, at least a portion of the method being performed by a computing device comprising at least one processor, the method comprising:
   selecting an incremental backup of a volume of data, the incremental backup of the volume of data storing a plurality of blocks from the volume of data that have changed since a previous backup of the volume of data;
   identifying block metadata for the incremental backup that describes a location of each block within the plurality of blocks in the incremental backup by specifying an offset of each block within the incremental backup;
   detecting synthesized block metadata for the previous backup that describes a location of each block in the volume of data according to a synthesized view of the volume of data from a full backup of the volume of data up to the previous backup by specifying an offset for each block within the volume of data that indicates a location of a version of each block as each block was at a time of the previous backup, wherein the synthesized block metadata specifies the offset of each block within the volume of data by:
      for each block that changed from a time of the full backup to the time of the previous backup, specifying the offset for the block as a size of a file of the full backup summed with the corresponding offset of the block within the previous backup;
      for each block that did not change from the time of the full backup to the time of the previous backup, specifying the offset for the block as the corresponding offset of the block within the full backup;
   combining the block metadata for the incremental backup with the synthesized block metadata for the previous backup to generate new synthesized block metadata for the incremental backup, the new synthesized block metadata specifying an offset for each block within the volume of data that indicates a location of a most current version of each block since the full backup, wherein the new synthesized block metadata specifies the offset of each block within the volume of data by:
      for each block that changed from the time of the previous backup to a time of the incremental backup, specifying the offset for the block as the size of the file of the full backup summed with both a size of a file of the previous backup and the corresponding offset of the block within the incremental backup;
      for each block that did not change from the time of the previous backup to the time of the incremental backup, specifying the offset for the block as the offset given by the synthesized block metadata;
   after generating the new synthesized block metadata, recovering at least one block of the volume of data as the at least one block was at a time of the incremental backup by identifying a location that describes the at least one block at the time of the incremental backup based on the offset of the at least one block specified by the new synthesized block metadata.

2. The computer-implemented method of claim 1, further comprising storing the new synthesized block metadata in association with the incremental backup for use by a recovery system to interpret the incremental backup in a new synthesized view.

3. The computer-implemented method of claim 1, wherein:
   the previous backup comprises a first sparse virtual disk file;
   the incremental backup comprises a second sparse virtual disk file.

4. The computer-implemented method of claim 3, wherein identifying the block metadata for the incremental backup comprises identifying the block metadata within the second sparse virtual disk file.

5. The computer-implemented method of claim 1, wherein combining the block metadata with the synthesized block metadata to generate the new synthesized block metadata for the incremental backup comprises generating the new synthesized block metadata without copying the plurality of blocks to generate a synthetic backup.

6. The computer-implemented method of claim 1, wherein the new synthesized block metadata indicates the location of the most current version of each block within the volume of data since the full backup by indicating, for each block within the volume of data, a backup file in which the most current version of the block is stored and an offset within the backup file at which the most current version of the block is stored.

7. A system for enabling efficient access to incremental backups, the system comprising:
   a selection module that selects an incremental backup of a volume of data, the incremental backup of the volume of data storing a plurality of blocks from the volume of data that have changed since a previous backup of the volume of data;

an identification module that identifies block metadata for the incremental backup that describes a location of each block within the plurality of blocks in the incremental backup by specifying an offset of each block within the incremental backup;

a detection module that detects synthesized block metadata for the previous backup that describes a location of each block in the volume of data according to a synthesized view of the volume of data from a full backup of the volume of data up to the previous backup by specifying an offset for each block within the volume of data that indicates a location of a version of each block as each block was at a time of the previous backup, wherein the synthesized block metadata specifies the offset of each block within the volume of data by:
　for each block that changed from a time of the full backup to the time of the previous backup, specifying the offset for the block as a size of a file of the full backup summed with the corresponding offset of the block within the previous backup;
　for each block that did not change from the time of the full backup to the time of the previous backup, specifying the offset for the block as the corresponding offset of the block within the full backup;

a combining module that combines the block metadata for the incremental backup with the synthesized block metadata for the previous backup to generate new synthesized block metadata for the incremental backup, the new synthesized block metadata specifying an offset for each block within the volume of data that indicates a location of a most current version of each block since the full backup, wherein the new synthesized block metadata specifies the offset of each block within the volume of data by:
　for each block that changed from the time of the previous backup to a time of the incremental backup, specifying the offset for the block as the size of the file of the full backup summed with both a size of a file of the previous backup and the corresponding offset of the block within the incremental backup;
　for each block that did not change from the time of the previous backup to the time of the incremental backup, specifying the offset for the block as the offset given by the synthesized block metadata;

a recovering module that recovers, after the new synthesized block metadata is generated, at least one block of the volume of data as the at least one block was at a time of the incremental backup by identifying a location that describes the at least one block at the time of the incremental backup based on the offset of the at least one block specified by the new synthesized block metadata;

at least one processor configured to execute the selection module, the identification module, the detection module, the combining module, and the recovering module.

8. The system of claim 7, further comprising a storing module that stores the new synthesized block metadata in association with the incremental backup for use by a recovery system to interpret the incremental backup in a new synthesized view.

9. The system of claim 7, wherein:
the previous backup comprises a first sparse virtual disk file;
the incremental backup comprises a second sparse virtual disk file.

10. The system of claim 9, wherein the identification module identifies the block metadata for the incremental backup by identifying the block metadata within the second sparse virtual disk file.

11. The system of claim 7, wherein the combining module combines the block metadata with the synthesized block metadata to generate the new synthesized block metadata for the incremental backup by generating the new synthesized block metadata without copying the plurality of blocks to generate a synthetic backup.

12. The system of claim 7, wherein the new synthesized block metadata indicates the location of the most current version of each block within the volume of data since the full backup by indicating, for each block within the volume of data, a backup file in which the most current version of the block is stored and an offset within the backup file at which the most current version of the block is stored.

13. A non-transitory computer-readable-storage medium comprising one or more computer-readable instructions that, when executed by at least one processor of a computing device, cause the computing device to:
　select an incremental backup of a volume of data, the incremental backup of the volume of data storing a plurality of blocks from the volume of data that have changed since a previous backup of the volume of data;
　identify block metadata for the incremental backup that describes a location of each block within the plurality of blocks in the incremental backup by specifying an offset of each block within the incremental backup;
　detect synthesized block metadata for the previous backup that describes a location of each block in the volume of data according to a synthesized view of the volume of data from a full backup of the volume of data up to the previous backup by specifying an offset for each block within the volume of data that indicates a location of a version of each block as each block was at a time of the previous backup, wherein the synthesized block metadata specifies the offset of each block within the volume of data by:
　　for each block that changed from a time of the full backup to the time of the previous backup, specifying the offset for the block as a size of a file of the full backup summed with the corresponding offset of the block within the previous backup;
　　for each block that did not change from the time of the full backup to the time of the previous backup, specifying the offset for the block as the corresponding offset of the block within the full backup;
　combine the block metadata for the incremental backup with the synthesized block metadata for the previous backup to generate new synthesized block metadata for the incremental backup, the new synthesized block metadata specifying an offset for each block within the volume of data that indicates a location of a most current version of each block since the full backup, wherein the new synthesized block metadata specifies the offset of each block within the volume of data by:
　　for each block that changed from the time of the previous backup to a time of the incremental backup, specifying the offset for the block as the size of the file of the full backup summed with both a size of a file of the previous backup and the corresponding offset of the block within the incremental backup;
　　for each block that did not change from the time of the previous backup to the time of the incremental backup, specifying the offset for the block as the offset given by the synthesized block metadata;

after generating the new synthesized block metadata, recover at least one block of the volume of data as the at least one block was at a time of the incremental backup by identifying a location that describes the at least one block at the time of the incremental backup based on the offset of the at least one block specified by the new synthesized block metadata.

14. The non-transitory computer-readable-storage medium of claim 13, wherein the one or more computer-readable instructions cause the computing device to store the new synthesized block metadata in association with the incremental backup for use by a recovery system to interpret the incremental backup in a new synthesized view.

* * * * *